(12) United States Patent
Yamazaki et al.

(10) Patent No.: US 8,236,112 B2
(45) Date of Patent: *Aug. 7, 2012

(54) GAS GENERATOR

(75) Inventors: Masayuki Yamazaki, Hyogo (JP);
Teppei Hanano, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 133 days.

This patent is subject to a terminal disclaimer.

(21) Appl. No.: 12/777,830

(22) Filed: May 11, 2010

(65) Prior Publication Data
US 2010/0290959 A1    Nov. 18, 2010

Related U.S. Application Data

(60) Provisional application No. 61/178,716, filed on May 15, 2009.

(30) Foreign Application Priority Data

May 12, 2009 (JP) .................................. 2009-115172

(51) Int. Cl.
*C06B 45/00* (2006.01)
*B60R 21/16* (2006.01)
(52) U.S. Cl. ....................... 149/2; 280/728.1; 280/728.2
(58) Field of Classification Search ... 149/2; 280/728.1, 280/728.2
See application file for complete search history.

(56) References Cited

U.S. PATENT DOCUMENTS

| | | | | |
|---|---|---|---|---|
| 6,779,812 B2* | 8/2004 | Ishida et al. | ................ | 280/741 |
| 7,390,019 B2* | 6/2008 | Gotoh et al. | ................ | 280/741 |
| 2004/0100079 A1* | 5/2004 | Yamazaki et al. | ............ | 280/741 |
| 2006/0273564 A1* | 12/2006 | McCormick et al. | ......... | 280/740 |
| 2007/0001438 A1* | 1/2007 | Patterson et al. | ............. | 280/740 |
| 2008/0078486 A1* | 4/2008 | Khandhadia et al. | ...... | 149/109.2 |

FOREIGN PATENT DOCUMENTS

| | | |
|---|---|---|
| JP | 2007-131254 A | 5/2007 |
| WO | WO 2006/130848 A2 | 12/2006 |

OTHER PUBLICATIONS

International Search Report dated Sep. 13, 2010, issued in corresponding PCT International Application No. PCT/JP2010/003122.
Written Opinion of the International Searching Authority dated Sep. 13, 2010, issued in corresponding PCT International Application No. PCT/JP2010/003122.

* cited by examiner

*Primary Examiner* — James McDonough
(74) *Attorney, Agent, or Firm* — Birch, Stewart, Kolasch & Birch, LLP

(57) ABSTRACT

A gas generator includes, a tubular housing, an ignition device attached to one end and a diffuser having a gas discharge port, attached to the other end of the housing, a tubular member, having first and second ends, disposed inside the housing such that the first and second ends are oriented towards the ignition device side and the diffuser side, respectively, and forming a tubular gap leading to the gas discharge port, a combustion chamber provided inside the tubular member, first and second gas passage holes formed on the first and second end sides, respectively, and an opening portion formed between the first and second gas passage holes, such that the gas passage holes and the opening portion communicate the combustion chamber with the tubular gap, and a projecting portion projecting from the opening portion into at least one of the combustion chamber and the tubular gap.

9 Claims, 4 Drawing Sheets

(a)

(b)

GAS GENERATOR

This nonprovisional application claims priority under 35 U.S.C. §119(a) to Patent Application No. 2009-115172 filed in Japan on 12 May 2009 and 35 U.S.C. §119 (e) to U.S. Provisional Application No. 61/178,716 filed on 15 May 2009, both of which are incorporated by reference.

BACKGROUND OF THE INVENTION

1. Field of the Invention

The present invention relates to a gas generator used in a restraining device installed in a vehicle, such as an air bag system, or the like, and more particularly to a gas generator used in a lateral collision air bag system for deploying an air bag on the side of an occupant.

2. Description of the Related Art

A gas generator of a side air bag for protecting an occupant during a lateral collision is often formed in an elongated shape due to attachment location restrictions.

US-A No. 2008/0078486 discloses a filterless-gas generator in which an initiator 32 is accommodated in one end portion of an elongated outer housing 12 and a diffuser portion formed with a gas discharge port 20 is provided in an opposite end portion.

In this gas generator, a booster cup 23 storing a booster agent and a divider 28 are disposed in the vicinity of the initiator 32, and an opening 28a is formed in the divider 28. A gas generating agent 16 is disposed in a space formed by an inner housing 14.

A booster 24 burned by the initiator 32 generates combustion products that enter the interior of the inner housing 14 through the opening 28a and burn the gas generating agent 16. Gas generated from the gas generating agent 16 passes through an orifice 18 in the inner housing 14 and escapes through a tubular gap between the outer housing 12 and the inner housing 14 to be discharged from gas discharge port 20 in the diffuser portion.

However, when this gas generator is activated, the gas generating agent 16 on the booster 24 side burns first, and therefore the generated gas passes through the unburned gas generating agent 16 to flow to the orifice 18, making it more difficult for the gas to flow. As a result, pressure in the interior of the inner housing 14 rises, and this pressure increase may cause constitutional members of the gas generator to break. Moreover, the gas generating agent 16 as a whole cannot be burned easily.

JP-A No. 2007-131254 discloses a gas generator such as that shown in FIG. 1, in which a tubular partition wall 19 (see FIG. 3) forming a combustion chamber 6 is disposed in the interior of a housing 3 that is short in an axial direction. Opening portions 22a, 22b are formed in a peripheral wall surface 19a of the tubular partition wall 19, and these opening portions 22a, 22b are formed by projecting a part of the peripheral wall surface 19a outwardly such that the opening portion 22a is oriented toward one end portion of the tubular partition wall 19 and the opening portion 22b is oriented toward an opposite end portion.

A gas generating agent 9 for inflating an air bag is disposed in the interior of the tubular partition wall 19, and combustion gas generated by the gas generating agent 9 is discharged to the outside through the opening portions 22a, 22b to flow toward the respective end portions of the tubular partition wall.

In the gas generator according to JP-A No. 2007-131254, when the combustion gas flows from the inside of the tubular partition wall toward the outside, basically the entire amount of the combustion gas (gas for inflating an air bag) passes through the opening portions 22a, 22b. Further, the gas generator according to JP-A No. 2007-131254 improves the efficiency in purifying and cooling the combustion gas, and is not concerned with improving an ignition/combustion performance of the gas generating agent.

SUMMARY OF THE INVENTION

The present invention provides a gas generator including:

a tubular housing in which an ignition device is attached at one end and a diffuser portion having a gas discharge port is attached at the other end, a tubular member, which has a first end portion and a second end portion, being disposed and fixed inside the tubular housing such that the first end portion is oriented towards a side of the ignition device and the second end portion is oriented towards a side of the diffuser portion, and a tubular gap leading to the gas discharge port is formed, a combustion chamber provided in an inside of the tubular member for accommodating a gas generating agent that generates a combustion gas, a first gas passage hole and a second gas passage hole formed on a side of the first end portion and a side of the second end portion, respectively, and an opening portion formed between the first gas passage hole and the second gas passage hole, the first gas passage hole, the second gas passage hole and the opening portion communicating the combustion chamber with the tubular gap, a projecting portion provided in the opening portion formed in the tubular member such that the projecting portion projects into at least one of the combustion chamber and the tubular gap.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Figure 1:
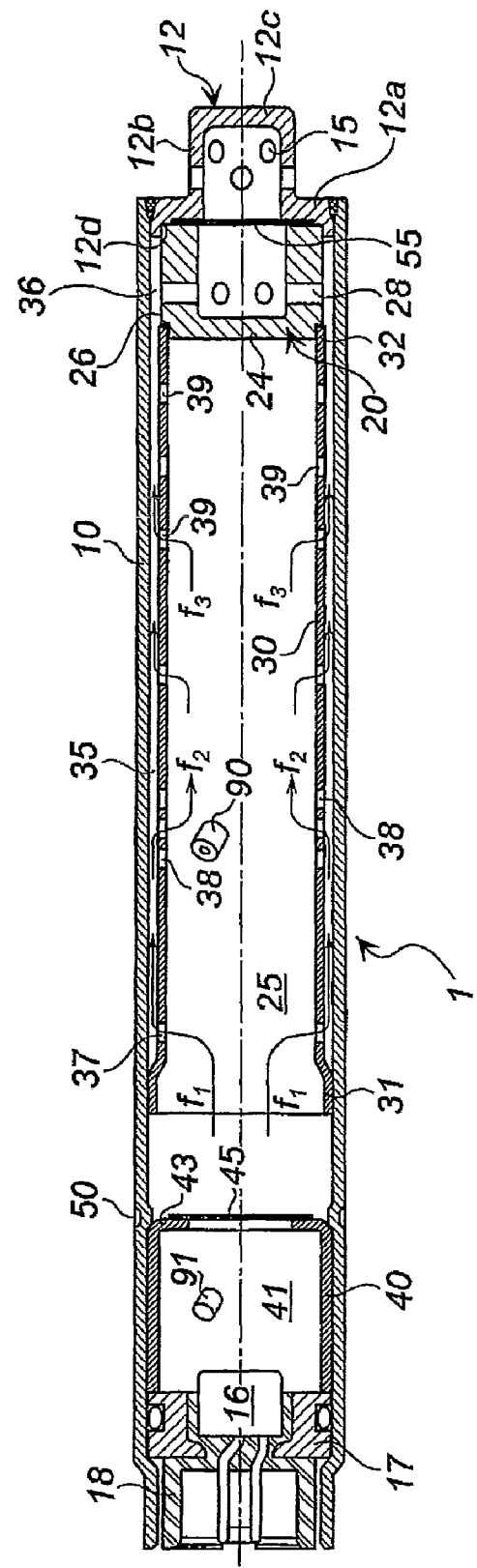
FIG. 1 shows an axial sectional view showing a gas generator according to an embodiment of the present invention.

The present invention provides a gas generator having a elongated housing, in which an overall ignition ability of a gas generating agent is improved, the gas flows more smoothly because of little occurrence of blockage of the combustion gas inside a housing and a timing of gas discharge is advanced.

The ignition device may include a known electric igniter alone or a combination of an electric igniter and a known transfer charge or gas generating agent.

The tubular member has a smaller outer diameter than an inner diameter of the tubular housing, and is disposed such that the first end portion is oriented toward the igniter side and the second end portion opposite to the first end portion is oriented toward the diffuser portion side. Due to the difference between the inner diameter of the tubular housing and the outer diameter of the tubular member, a tubular gap is formed between an inner wall surface of the tubular housing and an outer wall surface of the tubular member. This tubular gap serves as a passage for combustion gas generated by combustion of the gas generating agent, and the combustion gas flows from the ignition device side toward the diffuser portion side.

A length of the tubular member is shorter than a length of the tubular housing and equal to or shorter than a remaining length of the tubular housing excluding the ignition device and the diffuser portion disposed on the respective end sides thereof.

An interior space of the tubular member serves as a combustion chamber into which the gas generating agent is charged. Note that in order to secure reductions in size and weight, the gas generator according to the present invention does not employ a coolant/filter for cooling/filtering the combustion gas, but a coolant/filter may be used if necessary.

A projecting portion that projects toward one or both of the combustion chamber side and the tubular gap side is formed in the peripheral wall portion of the tubular member including the opening portion.

Two to six of such an opening portion may be formed in the circumferential direction on the peripheral wall portion of the tubular member. When the tubular member is longer in the axial direction, further two to three opening portions may be additionally formed in the axial direction.

When the gas generating agent is ignited and burned upon activation of the ignition device and combustion gas is generated, part of the combustion gas flows into the tubular gap through the first gas passage hole, but due to the opening portion formed with the projecting portion, part of the combustion gas that moves through the tubular gap in the axial direction (toward the diffuser portion) flows back inside the tubular member to assist combustion of the gas generating agent.

Hence, part of the combustion gas that is discharged to the outside from the interior of the tubular member (combustion chamber) flows back into the combustion chamber in a position that is further away from the ignition device, and therefore an improvement in the abilities of the ignition and combustion for the gas generating agent positioned far from the ignition device is obtained.

Since the above-mentioned abilities for the gas generating agent positioned far from the ignition device are improved, the overall abilities of the ignition and combustion for the gas generating agent are improved. The gas, that is generated by combustion of the gas generating agent, then flows back into the tubular gap through the second gas passage hole, and is finally discharged from the gas discharge port.

As described above, the combustion gas enters and exits the tubular gap, thereby repeatedly contacting the tubular member and the tubular housing in its process. This contact generates an effect whereby the temperature of the combustion gas decreases and an effect whereby particulates derived from a metallic component contained in the combustion gas adhere to and remain on a wall surface.

Further, part of the gas that flows through the tubular gap is returned to the combustion chamber by the opening portion formed with the projecting portion, but the remainder continues to flow through the gap in the axial direction to the gas discharge port. The flow of this remaining gas is not obstructed before the gas reaches the gas discharge port, and therefore a gas discharge timing can be advanced.

Further, the combustion gas that flows into the tubular member through the opening portion is only part of the combustion gas flowing through the gap, and the remaining combustion gas continues to flow inside the gap toward the diffuser portion. Hence, gas blockages do not occur in the gap, and as a result, the gas flows smoothly through the housing interior.

The gas generator according to the present invention is particularly effective when the tubular housing has an elongated shape. Accordingly, favorable abilities of the ignition and combustion for a gas generating agent and a favorable gas discharge property are obtained even when a ratio (L/D) between a length (L) and an outer diameter (D) of the tubular housing is 4 or more.

The present invention provides a preferable gas generator according to the invention, wherein the projecting portion includes a guiding plate formed with a part of a peripheral wall portion of the tubular member projected to the combustion chamber side, and the guiding plate acts such that gas having flowed into the combustion chamber through the opening portion flows to the diffuser portion side.

Due to the action of the guiding plate provided in the projecting portion, the gas that flows into the combustion chamber is caused to flow to the diffuser portion side. Thus, combustion of the gas generating agent is assisted.

The present invention provides a preferable gas generator according to the invention, wherein the projecting portion includes a guiding plate formed with a part of a peripheral wall portion of the tubular member projected to the tubular gap side, and the guiding plate acts such that gas having flowed through the tubular gap is introduced into the combustion chamber through the opening portion and caused to flow to the diffuser portion side.

Due to the action of the guiding plate provided in the projecting portion, the gas that flows through the tubular gap is forcibly introduced into the combustion chamber, whereupon the gas that flows into the combustion chamber is caused to flow to the diffuser portion side. Thus, combustion of the gas generating agent is assisted.

The tubular member of the present invention is preferably formed by combining two semicircular tube-shaped members having a peripheral wall portion, especially for the embodiment having a guide plate projecting to the gap outwardly.

With the gas generator according to the present invention, the overall combustibility of the gas generating agent can be improved even when the tubular housing has an elongated shape, and a favorable gas discharge property is also obtained.

Embodiments of the Invention (1) Gas Generator of FIG. 1

An embodiment of the present invention will be described with reference to FIG. 1. FIG. 1 is a sectional view of a gas generator 1 in the axial direction. Note, however, that FIG. 1 does not show a projecting portion 50 of a tubular member shown in FIG. 2.

An ignition device including an igniter 16 and a first gas generating agent 91 are attached to one end portion of a tubular housing 10. The first gas generating agent 91 is used as a transfer charge. The igniter 16 is integrated with a metallic igniter collar 17 by resin 18 and fixed to one end portion of the tubular housing 10. A ratio (L/D) between a length (L) and an outer diameter (D) of the tubular housing 10 is preferably between 4 and 8, but is not limited to this range.

The first gas generating agent 91 is charged into a transfer charge accommodating chamber 41 formed by a tubular retainer 40. An opening portion at one end of the tubular retainer 40 abuts against the igniter collar 17, and an opening portion at the other end is blocked by a sealing tape 45. A folded portion 43 bent inwardly is formed in the opening portion at the other end, which is blocked by the sealing tape 45, and the tubular retainer 40 is fixed at the folded portion 43 by the projection 50 formed on the tubular housing 10.

Instead of the sealing tape 45, wire mesh or the like having a hole in such a size that the first gas generating agent 91 cannot pass through may be provided as a partition, ensuring that the first gas generating agent 91 does not mix with a second gas generating agent 90 prior to activation.

A gas generating agent having a favorable ignition property and a favorable combustion maintaining property (a high combustion temperature) may be used as the first gas generating agent 91. The combustion temperature of the first gas generating agent 91 is preferably within a range of 1700 to 3000° C. An example of such a first gas generating agent 91 may be a gas generating agent in a shape of a cylinder having an outer diameter of 1.5 mm and a thickness of 1.5 mm, which includes nitroguanidine (34% by weight) and strontium nitrate (56% by weight).

A cup-shaped diffuser portion 12 is attached to the other end of the tubular housing 10. The diffuser portion 12 is fixed to the tubular housing 10 at a flange portion 12a by welding, and includes a peripheral wall portion 12b provided with a plurality of gas discharge ports 15, and a bottom portion 12c.

A cup-shaped member 20 is disposed at an end of the diffuser portion 12 side in the interior of the tubular housing 10. A peripheral edge of an opening portion of the cup-shaped member 20 is fitted into a stepped notch 12d formed in the flange portion 12a. A plurality of communication holes 28 are formed in a peripheral surface 26 of the cup-shaped member 20. An outer diameter of the cup-shaped member 20 is set to be smaller than an inner diameter of the tubular housing 10.

A sealing tape 55 is adhered to the opening portion of the cup-shaped member 20. The sealing tape 55 is used to protect the second gas generating agent 90 and the first gas generating agent 91 from moisture infiltrating through the gas discharge ports 15.

A tubular member 30 having a smaller outer diameter than the inner diameter of the tubular housing 10 is disposed in the interior of the housing 10.

The tubular member 30 is formed such that a first end portion 31 thereof in the igniter 16 side has an enlarged diameter, and such that an outer diameter of the first end portion 31 is slightly larger than the inner diameter of the tubular housing 10 prior to attachment to the tubular housing 10. When the tubular member 30 is inserted into the tubular housing 10, an outer wall surface of the first end portion 31 is fixed by pressing against an inner wall surface of the tubular housing 10.

The tubular member 30 is positioned within the tubular housing 10 by fitting a second end portion 32, directed to the diffuser portion side, into an annular step portion formed in a bottom portion 24 of the cup-shaped member 20, together with the pressing force of the first end portion 31. The central axis of the tubular housing 10 coincides with the central axis of the tubular member 30.

The interior of the tubular member 30 serves as a combustion chamber 25 into which the single-perforated cylindrical second gas generating agent 90 is charged. The second gas generating agent 90 has a lower combustion temperature than that of the first gas generating agent 91. The combustion temperature of the second gas generating agent 90 is preferably within a range of 1000 to 1700° C. An example of the second gas generating agent 90 may be a gas generating agent in a shape of a single perforated cylinder having an outer diameter of 1.8 mm, an inner diameter of 0.7 mm and a length of 1.9 mm, which includes guanidine nitrate (41% by weight), basic copper nitrate (49% by weight), a binder and an additive.

The inner diameter of the tubular housing 10 is larger than the outer diameter of the tubular member 30, and, due to the difference between the above inner diameter and outer diameter, a tubular gap 35 having a uniform width is formed between the inner wall surface of the tubular housing 10 and the outer wall surface of the tubular member 30. Note that a tubular gap 36 is formed likewise between an outer wall surface of the cup-shaped member 20 and the inner wall surface of the tubular housing 10, and this tubular gap 36 comes to a dead end at the flange 12a of the diffuser portion. Hence, the tubular gap 36 serves as a tubular pocket for retaining therein particulates generated by combustion of the gas generating agent.

Further, first gas passage holes 37 are formed in a peripheral wall portion on the first end portion 31 side of the tubular member 30. The first gas passage holes 37 are formed at equal intervals in the circumferential direction of the tubular member 30. In FIG. 1, the first gas passage holes 37 are formed in a single row, but they may be formed in a plurality of rows.

Second gas passage holes 39 are formed on the second end portion 32 side of the tubular member 30. The second gas passage holes 39 are likewise formed at equal intervals in the circumferential direction of the tubular member 30. In FIG. 1, the second gas passage holes 39 are formed in four rows.

Opening portions 38 are formed between the first gas passage holes 37 and the second gas passage holes 39. Four opening portions 38 are formed at equal intervals in the circumferential direction of the tubular member 30.

Next, referring to FIGS. 2(a) and 2(b), the four opening portions 38 will be described in detail. FIG. 2(a) is a partial enlarged perspective view of the tubular member 30 used in FIG. 1 (note, however, that a part of a peripheral wall 30a has been partially cut away in the site of second end portion 32 to show the interior). In FIG. 2(a), the enlarged diameter part of the first end portion 31 has been omitted, and therefore only three of the four opening portions 38, specifically 38a, 38b, 38c, are shown while the opening portion 38 positioned opposite 38b is omitted. FIG. 2(b) is a partial sectional view showing the opening portion 38a of FIG. 2(a) in the axial direction.

An inside-projecting portion 50 is formed on an inner side of the tubular member 30 corresponding to the opening portion 38a. The inside-projecting portion 50 includes a guiding plate 51, two side surface portions 52 provided on both sides of the guiding plate 51 in the width direction and two introduction ports 53a, 53b provided on both sides in the longitudinal direction (axial direction) of the guiding plate 51. The opening portion 38a brings the tubular gap 35 into communication with the combustion chamber 25 via the two introduction ports 53a, 53b. The inside-projecting portion 50 may be formed by pressing the peripheral wall 30a of the tubular member 30 from the outside toward the inside. The remaining opening portions 38 include similar inside-projecting portions 50, although the inside-projecting portion 50 of the opening portion 38d is not shown in the drawing. Note that the guiding plate 51 may be inclined such that the introduction port 53b is formed larger than the introduction port 53a.

Figure 2:
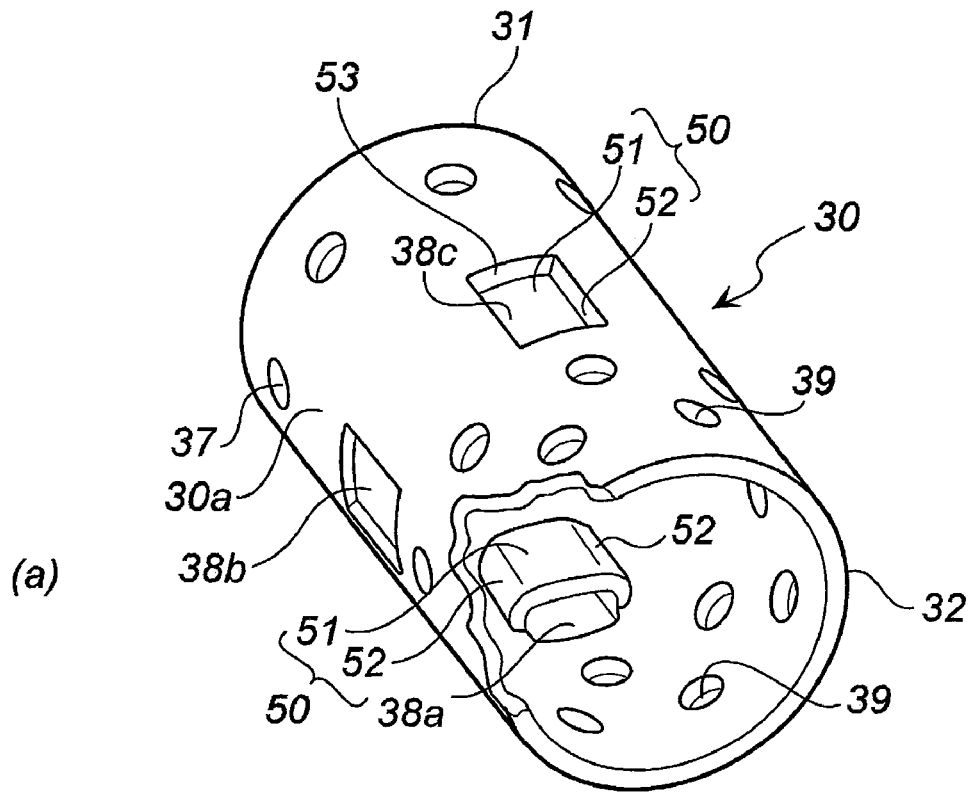
FIG. 2(a) shows a perspective view of a tubular member that can be used in the gas generator of FIG. 1.
FIG. 2(b) shows a partial sectional view of FIG. 2(a)
Figure 2:
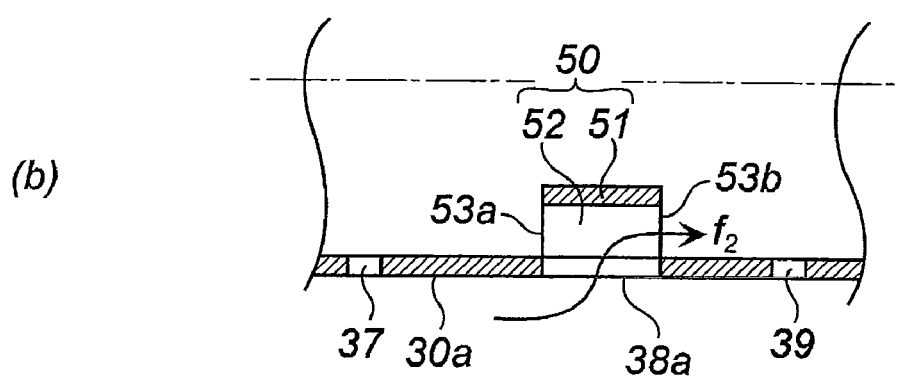
Figure 3:
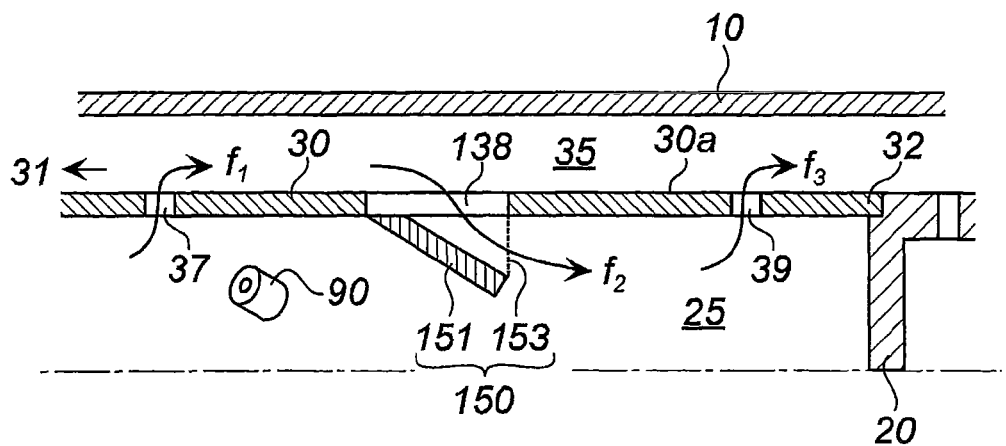
FIG. 3 shows a partial sectional view of a tubular member according to another embodiment, which can be used in the gas generator of FIG. 1.

FIG. 3 is a partial sectional view showing another embodiment in which the structure of an opening portion 138 differs from that of the corresponding opening portion 38 shown in FIG. 2. FIG. 2 and FIG. 3 differ only in the respective structures of the opening portion 38 and the opening portion 138 and are identical in all other structures. Therefore, other parts are indicated using identical reference numerals.

Figure 5:
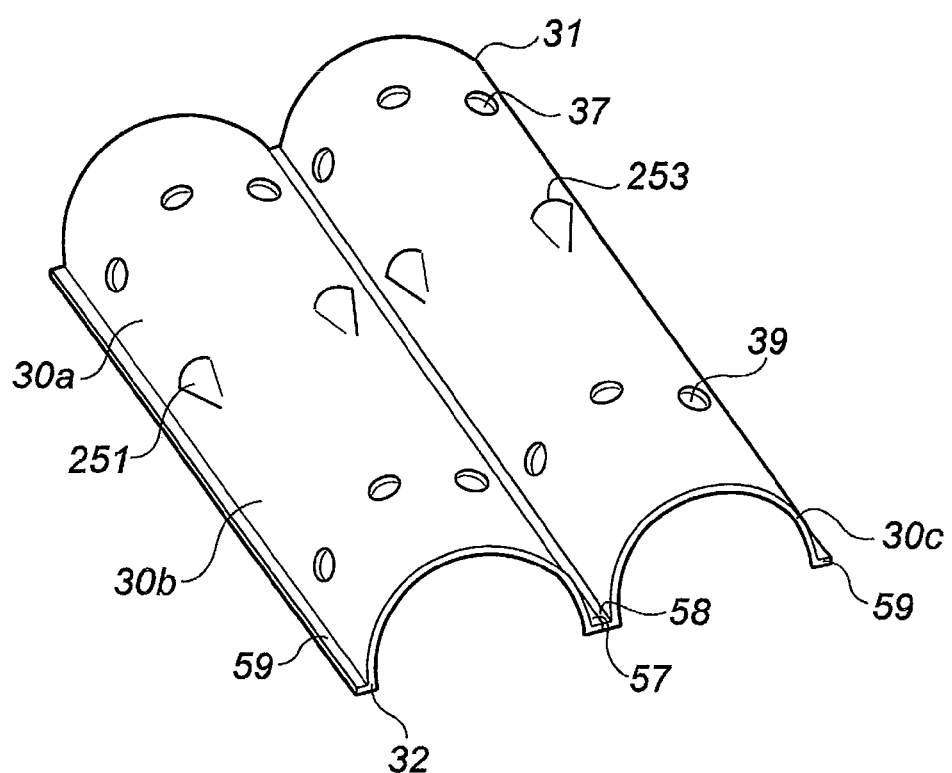
FIG. 5 shows an illustrative view showing a method of manufacturing the tubular member shown in FIG. 4.

In the inner side of the tubular member 30 corresponding to the opening portion 138, an inside-projecting portion 150 including a guiding plate 151 and an introduction port 153. The guiding plate 151 is formed such that a part thereof in the first end portion 31 side is integrated with the tubular member 30, while a part thereof in the second end portion 32 side is pushed down towards the combustion chamber 25. A shape of the inside projecting portion 150 from the view of the inside of the combustion chamber 25 is in a triangular shape such as shown in FIG. 5, and a part of the peripheral wall 30a excluding the introduction port 153 is pushed in (or projected inwardly). The opening portion 138 brings the tubular gap 35 into communication with the combustion chamber 25 via the introduction port 153. The inside-projecting portion 150 may be formed by pressing the peripheral wall 30a of the tubular member 30 from the outside toward the inside.

Figure 4:
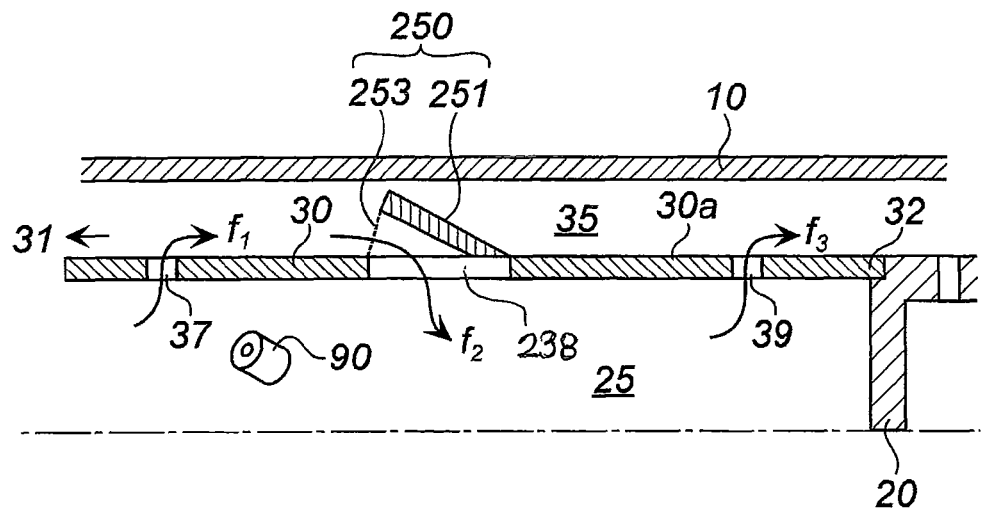
FIG. 4 shows a partial sectional view of a tubular member according to still another embodiment, which can be used in the gas generator of FIG. 1.

FIG. 4 is a partial sectional view showing still another embodiment in which the structure of an opening portion 238 differs from that of the corresponding opening portion 38 shown in FIG. 2. FIG. 2 and FIG. 4 differ only in the respective structures of the opening portion 38 and the opening portion 238 and are identical in all other structures. Therefore, other parts are indicated using identical reference numerals.

On the outer side (the tubular gap 35 side) of the tubular member 30 corresponding to the opening portion 238, an outside-projecting portion 250 including a guiding plate 251 and an introduction port 253. The guiding plate 251 is formed such that a part thereof on the second end portion 32 side is integrated with the tubular member 30, and a part thereof on the first end portion 31 side is pushed in towards the tubular gap 35. A shape of the outside projecting portion 250 from an outside view is in a triangular shape such as shown in FIG. 5, and a part of the peripheral wall 30a excluding the introduction port 253 is raised (or projected outward). The opening portion 238 brings the tubular gap 35 into communication with the combustion chamber 25 via the introduction port 253.

The outside-projecting portion 250 shown in FIG. 4 may be formed by the following method which will be described with reference to FIG. 5. FIG. 5 is a perspective view showing a state prior to assembly of the tubular member 30 shown in FIG. 4. Note that the tubular member 30 shown in FIGS. 2 and 3 also may be manufactured by applying a similar method.

In the tubular member 30, a first member 30b and a second member 30c, both in a semicircular tube shape, are connected by an edge 57 formed in the length direction. A thin portion 58 is formed on the edge 57 from the first end portion 31 to the second end portion 32. A flange 59 is formed on opposite side of the part connected by the edge 57 on each of the first member 30b and the second member 30c.

The tubular member 30 is formed into the cylindrical tubular member 30 by being bent along the thin portion 58 of the edge 57 and joining the flanges 59 each other to be fixed by a method such as welding or crimping.

The tubular member 30 shown in FIG. 4 has to be pressed from the inside toward the outside in order to project the guiding plate 251 outside (on the tubular gap 35 side) of the tubular member 230. Hence, by providing a halved structure shown in FIG. 5, the opening portion 238 (projecting portion) can be processed easily.

Note that the gas generator 10 may employ a tubular member 30 provided with combination of the guiding plate 151 shown in FIG. 3 and the guiding plate 251 shown in FIG. 4. In this case, the guiding plate 151 shown in FIG. 3 is formed on the first end portion 31 side and the guiding plate 251 shown in FIG. 4 is formed on the second end portion 32 side, so that the opening portions disappear when the guiding plate 151 and the guiding plate 251 are closed and appear when the guiding plate 151 and the guiding plate 251 are opened. With this embodiment, the actions of both FIG. 3 and FIG. 4 can be obtained.

Next, an operation of the gas generator 1 shown in FIG. 1 employing the tubular members 30 shown in FIG. 2 and FIG. 3 will be described.

When the igniter 16 is activated, the first gas generating agent 91 burns, the sealing tape 45 is ruptured, and combustion gas flows into the interior of the tubular member 30.

The second gas generating agent 90 starts to burn by the above combustion gas, and this combustion advances in the axial direction (towards the diffuser portion 12). During this process, however, part of the combustion gas flows into the tubular gap 35 through the plurality of first gas passage holes 37 (a gas flow f1). Part of the combustion gas that advances through the tubular gap 35 in the axial direction flows through the opening portions 38 (or the opening portions 138) and along the guiding plate 51 (or the guiding plate 151) to enter the tubular member 30 mainly through the introduction port 53b (or the introduction port 153), whereupon this combustion gas flows towards the diffuser portion 12 (a gas flow f2), assisting ignition and combustion of the second gas generating agent 90. Hence, the overall ability in combustion of the second gas generating agent 90 is improved by ignition and combustion of the second gas generating agent 90 advancing axially inside the tubular member 30 as well as ignition and combustion of the second gas generating agent 90 assisted by the combustion gas flowing through the first gas passage holes 37.

The remaining gas that does not enter the tubular member 30 through the opening portions 38 (or the opening portions 138) keeps flowing inside the tubular gap 35 towards the diffuser portion 12. This gas flow reaches the diffuser portion 12 more quickly, and therefore the time required for the gas to be discharged through the gas discharge ports 15 from start of activation is shorter.

The gas generated through advancement of the combustion then flows into the tubular gap 35 through the plurality of second gas passage holes 39 (a gas flow f3), passes through the communication holes 28 in the cup-shaped member 20, and is finally discharged from the gas discharge ports 15 in the diffuser portion 12.

An operation of the gas generator 1 shown in FIG. 1 employing the tubular member 30 shown in FIG. 4 is as follows. Part of the combustion gas generated by combustion of the second gas generating agent 90 flows into the tubular gap 35 through the plurality of first gas passage holes 37 (the gas flow f1). Further part thereof enters from the introduction port 253 and impinges on the guiding plate 251 to change a flow direction, whereupon the gas enters the interior of the tubular member 30 through the opening portions 238 (the gas flow f2), assisting ignition and combustion of the second gas generating agent 90.

With a gas flow (gas flow f1→f2→f3) in the manner described above, the combustion gas repeatedly contacts the inner wall surface of the tubular housing 10, the outer wall surface of the tubular member 30, the guiding plates 51, 151, 251 of the inside-projecting portions 50, 150 and the outside-projection portion 250, and so on. And through this contact, the combustion gas temperature decreases, and an effect, in which a mist derived from a metallic component contained in the combustion gas adheres to and be retained on the wall surfaces, can be obtained.

The gas generator 1 according to the present invention is structured as described above and capable of performing the operation described above. Therefore, the gas generating agent can be burned smoothly even when the gas generator 1 has a shape elongated in the axial direction within a range of $L/D=4$ to 8, and as a result, the gas generator can be activated quickly. In the case of the combustion chamber, formed in the tubular housing 10, being long in the axial direction, a problem has been acknowledged that a long time is required for combustion to advance sequentially from one end to the opposite end of the combustion chamber. The problem is solved by the gas generator according to the present invention.

The invention thus described, it will be obvious that the same way may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising:
   a tubular housing in which an ignition device is attached at one end and a diffuser portion having a gas discharge port is provided at the other end;
   a tubular member having a combustion chamber for accommodating, therein, a gas generating agent that generates a combustion gas, the tubular member having a first end portion and a second end portion, and disposed and fixed inside the tubular housing such that the first end portion is oriented towards a side of the ignition device and the second end portion is oriented towards a side of the diffuser portion, and defining a tubular gap between the tubular member and the tubular housing leading to the gas discharge port, the tubular member including,
      a first gas passage hole formed in a peripheral wall portion of a side of the first end portion of the tubular member and communicating the combustion chamber and the tubular gap,
      a second gas passage hole formed in the peripheral wall portion on a side of the second end portion of the tubular member and communicating the combustion chamber and the tubular gap, and
      an opening portion formed between the first gas passage hole and the second gas passage hole, and communicating the combustion chamber and the tubular gap;
   a projecting portion provided on the peripheral wall portion corresponding to the opening portion of the tubular member such that the projecting portion projects into at least one of the combustion chamber and the tubular gap.

2. The gas generator according to claim 1, wherein the projecting portion includes a guiding plate formed with a part of a peripheral wall portion of the tubular member projected to the combustion chamber side, and the guiding plate acts such that gas having flowed into the combustion chamber through the opening portion flows to the diffuser portion side.

3. The gas generator according to claim 1, wherein the projecting portion includes a guiding plate formed with a part of a peripheral wall portion of the tubular member projected to the tubular gap side, and the guiding plate acts such that gas having flowed through the tubular gap is introduced into the combustion chamber through the opening portion and caused to flow to the diffuser portion side.

4. The gas generator according to claim 3, wherein the tubular member is formed by combining two semicircular tube-shaped members having a peripheral wall portion.

5. The gas generator according to claim 1, wherein the projecting portion includes,
   a guiding plate,
   two projecting portions provided on both width sides of the guiding plate, and
   two introducing ports on both sides on a longitudinal direction of the guiding plate.

6. The gas generator according to claim 5, wherein the guiding plate is inclined such that one of the two introducing ports provided in the side of the second end portion is larger than the other of the two introducing ports provided in the side of the first end portion.

7. The gas generator according to claim 1, wherein the projecting portion includes a guiding plate and the guiding plate is formed such that a part thereof in the side of the first end portion is integrated with the tubular member, and a part thereof in the side of the second end portion is pushed down towards the combustion chamber.

8. The gas generator according to claim 1, wherein the projecting portion includes a guiding plate and the guiding plate is formed such that a part thereof in the side of the second end portion is integrated with the tubular member, and a part thereof in the side of the first end portion is pushed in towards the tubular gap.

9. A gas generator comprising:
   a tubular housing in which an ignition device is provided at one end and a diffuser portion having a gas discharge port is attached at the other end;
   a tubular member, which has a first end portion and a second end portion, disposed and fixed inside the tubular housing such that the first end portion is oriented towards a side of the ignition device and the second end portion is oriented towards a side of the diffuser portion, and defining a tubular gap between the tubular member and the tubular housing leading to the gas discharge port, the tubular member including a first gas passage hole and a second gas passage hole formed on a side of the first end portion and a side of the second end portion, respectively, and an opening portion formed between the first gas passage hole and the second gas passage hole, the first gas passage hole, the second gas passage hole, and the opening portion communicating the combustion chamber with the tubular gap;
   a combustion chamber provided inside of the tubular member for accommodating a gas generating agent that generates a combustion gas; and
   a projecting portion attached to the tubular member and extending over the opening portion and projecting into at least one of the combustion chamber and the tubular gap to deflect the combustion gas flowing through the opening portion.

* * * * *